Oct. 23, 1956  W. C. HOWARD  2,767,724
TIME-CYCLE CONTROL SYSTEM
Filed Dec. 30, 1954

INVENTOR.
WILLIAM C. HOWARD
BY
Raymond D. Junkins
ATTORNEY

United States Patent Office 2,767,724
Patented Oct. 23, 1956

2,767,724

TIME-CYCLE CONTROL SYSTEM

William C. Howard, Gates Mills, Ohio, assignor to Bailey Meter Company, a corporation of Delaware Application December 30, 1954, Serial No. 478,580

6 Claims. (Cl. 137—82)

The present invention is directed to time-cycle control of variables.

The inventor wishes to define time-cycle control as he understands it. Basically, these control systems vary the magnitude of a variable over an established period of time in accordance with a predetermined program. The variable controlled is measured and compared with a force proportional to the desired programmed value for the variable. A means is actuated in accordance with the comparison and establishes an output representative of the difference between the measured variable and programmed force which is applied to control of an agent affecting the magnitude of the variable.

Many industrial processes demand control of flows, levels, temperatures or other variables in accordance with predetermined programs for their magnitudes. The present invention provides this control by measuring the variable in terms of fluid pressure and continuously comparing this fluid pressure with a fluid pressure established to vary on a predetermined program. The structure comparing the two fluid pressures is caused to establish a single control fluid pressure, used to directly vary the magnitude of the control variable.

In the drawings, there is disclosed a preferred embodiment of the invention. This embodiment utilizes, and establishes, pneumatic pressures to attain its objects. The structure is believed to possess a unique flexibility by an arrangement wherein the measured and programmed variables are to be attained in terms of pneumatic pressures which are continuously compared in a relay capable of introducing proportional, reset, and rate characteristics to its output of pneumatic control pressure. With this arrangement, the programmed pressure can be conveniently isolated from the relay and a manually adjusted pneumatic pressure substituted therefor. Also, with this arrangement, the programmed pressure may be biased in value by a manually adjusted structure to supplement, or modify, the predetermined program for the variable.

The basic arrangement of directly, and separately, establishing fluid pressures representative of the variable measured, and the programmed value of the variable, permits the convenient recordation of the values. Thus, if the variable deviates from its program because of some malfunction not immediately discernable and correctable, the substituted, manually established fluid pressure, may be utilized to keep the variable within satisfactory limits, using the records as a guide.

As may be observed from a study of the drawing disclosure, the preferred embodiment is planned to bring the structure establishing the programmed pneumatic pressure into a unit which, in dimensions, compares with the recording units. This makes it possible to mount the program and recordation structure in a single case, or housing. The single case, or housing, can then be mounted so that it can be easily supervised by operating personnel. The programming unit becomes a catalog, or "shelf," item to be stocked in quantity. Subsequent mounting in any of the positions selected in the recorder case can be accomplished by "plug-in" techniques.

A generalized object of the invention, then, is to control a variable on a time-cycle basis.

A further object is to control a variable on a time-cycle basis by use of a programmed fluid pressure.

A further object is to control a variable by a fluid pressure established as a relay output created by comparing a programmed fluid pressure and a force established as representative of the magnitude of the variable to be programmed.

A further object is to control a variable by a fluid pressure and to provide means for substituting a manually controlled fluid pressure for the programmed fluid pressure.

A further object is to control a variable by fluid pressure and to provide a means for biasing the value of the program fluid pressure.

A further object is to control a variable on a time-cycle basis by a program fluid pressure and to provide structure for imparting proportional and/or rate and/or reset characteristics to the control fluid pressure dependent on the program fluid pressure.

A further object is to provide a time-cycle control system for a variable in which the program fluid pressure unit is grouped with the recording units of the system in a single instrument case.

Figures 1, 2, 3:
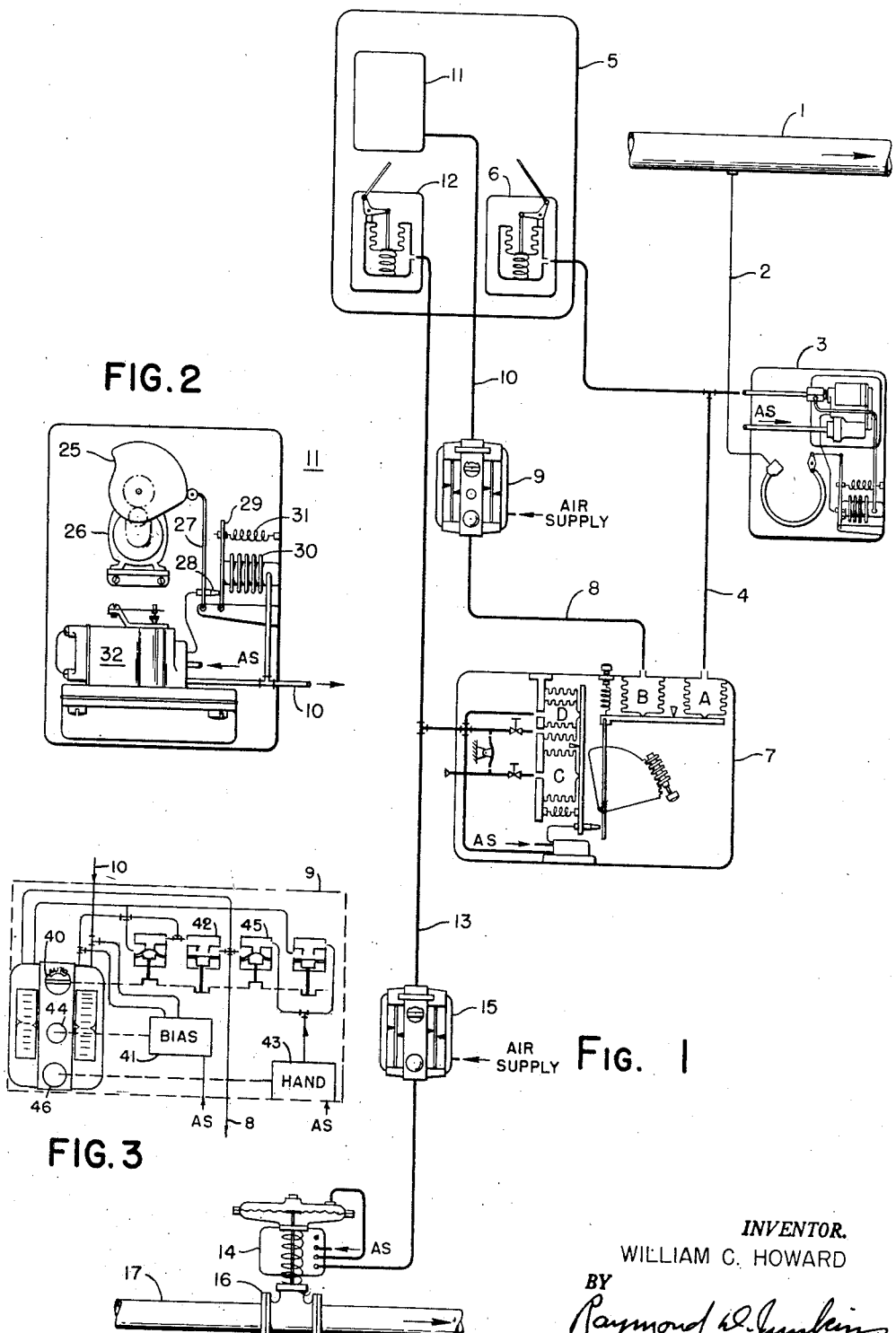
Fig. 1 is a somewhat diagrammatic control system layout of the preferred embodiment of the invention.
Fig. 2 is a front elevation of the unit, establishing the program fluid pressure, which may be mounted in the instrument case.
Fig. 3 is a diagrammatic illustration of the internal structure of a selector station of Fig. 1.

Referring specifically to Fig. 1, the general scheme may be appreciated whereby a variable pressure is measured and its magnitude controlled by the manipulation of a valve regulating the supply of one, or more, of the agents influencing the magnitude of the pressure. The force established by the instrumentality sensing the magnitude of the pressure is modified by a force made to vary on a predetermined program. The modified force is applied to control of the variable to result in variations of its magnitude on a time-cycle basis.

Fluid pressures are established as the forces representative of the variable and program values and are continuously compared to establish a control fluid pressure which regulates the supply of the agent influencing the magnitude of the variable. Instrumentalities for establishing these fluid pressures, recording them, terminating them, biasing them and imparting proportional-reset-rate characteristics to them are illustrated and will be explained infra.

Referring now, specifically, to Fig. 1, attention is first directed to conduit 1 in which the variable pressure controlled is located. This pressure condition is assumed to be capable of being varied by at least the agent supplied through conduit 17. The flow of the agent in conduit 17 is regulated by positioning valve 16 located therein.

Sensing pipe 2 can be clearly seen as arranged to take the pressure in conduit 1 to transmitter 3. Transmitter 3 is an instrumentality, sensitive to pressure, which establishes a signal pneumatic pressure within a predetermined range. More specifically, this transmitter receives the pressure of pipe 2 in a Bourdon tube which mechanically moves one half of a fluid pressure couple. The output of this fluid pressure couple is amplified by a relay which causes the second half of the fluid pressure couple to follow the first half and simultaneously establish the output of the transmitter. The internal structure of transmitter 3, represented somewhat diagrammatically here, is disclosed and claimed in an application by Gorrie et al. S. N. 289,402, filed May 22, 1952, now Patent No. 2,737,963.

Pressure transmitter 3 establishes a pneumatic pressure, proportional to the variable of conduit 1, in pipe 4. There are provisions within the transmitter for indicating the output as well as remote provisions in case 5 for recording and/or indicating.

As a central point of attention, for operating personnel, case 5 is important. Responsive mechanism 6, mounted in case 5, is depicted as essentially comprised of a bellows continuously responsive to the pressure in pipe 4. It was not deemed necessary to further illustrate that the bellows is mechanically linked to a recording pen which is moved over a chart to make a permanent record thereon. For specific information with respect to the form and function of this apparatus, attention is directed to copending application by Panich S. N. 408,725, filed February 8, 1954.

In addition to being indicated and recorded, the pressure in pipe 4 is conducted into relay 7 for modification into a value which will desirably control the magnitude of the pressure in conduit 1 in a predetermined time-cycle. Specifically, the pressure in pipe 4 is received in a responsive bellows A of relay 7. Bellows A and B are opposed across the fulcrum of a beam. This arrangement results in the pressure of pipe 4 being opposed by the pressure received in bellows B. Differences between the two pressures will result in a movement of the beam, and half of a pneumatic pressure couple, against the force of a spring. The output of the couple positions the second half of the couple toward the first half and simultaneously becomes the relay output. The mechanism of relay 7, here diagrammatically disclosed, is specifically disclosed and claimed in applications by Gorrie S. N. 311,098, filed September 23, 1952, and Panich S. N. 392,132, filed November 16, 1953.

Considering now the mechanism establishing the fluid pressure in bellows B of relay 7, the description moves to a central element of the combination. Pipe 8 conducts pressure to the bellows B. This pressure of pipe 8 is next considered as the output of a selector station 9, which will subsequently be described in more detail. Consider next pipe 10 which supplies the program fluid pressure to selector station 9. The pressure in this pipe 10 is the output of time-cycle unit 11, mounted in case 5.

Fig. 2 is devoted, exclusively, to specific illustration of the essential components of unit 11. It is sufficient to appreciate at this point in the description that a cam of predetermined profile is made to position a fluid pressure couple whose output is amplified and established in pipe 10. The profile of the cam becomes a central element of the combination in that it establishes the variation of the magnitude of the fluid pressure in pipe 10 on a time-cycle basis. When the pressure in pipe 10 is received into bellows B of relay 7, the resulting comparison will produce the output as described supra, which is, specifically, the control pressure which will establish the value of the pressure condition in conduit 1. Without further consideration of the structure disclosed, it may now be appreciated that the first general object of the invention is attained.

The description of the function, up to this point, has been of an ideal concept. Subjectively, it will be appreciated by those skilled in the art that the program for the pressure condition in conduit 1 may be distorted by any number of external factors not immediately discernable or correctable. From another viewpoint, the actual magnitude of the variable pressure condition may be forced "out of step" with the predetermined program of the cam profile of time-cycle unit 11. Recording unit 12, also mounted in case 5, is continuously recording the magnitude of the control pressure of relay 7. Comparison of the two records on the chart of recorder case 5 allows operating personnel to be aware of any out-of-phase condition arising between variable and program for the variable. One function of selector station 9 permits corrective adjustments in view of these possible conditions.

A front elevation of selector 9 is illustrated in Fig. 1. Pipes 8 and 10 are joined through this structure. In function, this station 9 permits manual termination of communication between pipes 8 and 10. Additionally, the provision exists for substituting a manually established fluid pressure in pipe 8. Finally, with pipes 8 and 10 in communication, station 9 permits the addition of a manually determined bias value to the output pressure in pipe 8 established in bellows B.

Specific details of the structure of selector station 9 are set forth in Panich et al. 2,731,023. Fig. 3 illustrates these portions of the structure in which the present invention is embodied. The station 9 is shown in its "automatic" arrangement. Pipes 8 and 10 are in communication. In the "manual" arrangement, pipe 8 is isolated from pipe 10 and connected to the manually controlled unit determining an arbitrary fluid pressure.

Essentially, station 9 comprises four on-off valves, a bias unit responsive to a variable input fluid pressure and establishing an output pressure equal to the input pressure plus an arbitrary fluid pressure, a hand unit determining an independent fluid pressure, two groups of indicating gages and piping connecting the valves, units and gages. The valves are actuated in unison, by manual knob 40 rotating a shaft with protuberances engaging the stems of the valves. The "open" and "closed" functions of these valves are clear from the drawings. In the position shown for the valves, the pressure of pipe 10, clearly routed through bias unit 41, is communicated to pipe 8 through valve 42. The gages are responsive to the pipe 10, bias unit 41, pipe 8 and hand unit 43 in a certain sequence. Manual knob 44 determines the amount of bias added to the pressure of pipe 10 by bias unit 41.

Considering the alternate, or "manual" position of knob 40 and the valves, pipe 8 is isolated from the output of bias unit 41 and communicated with the output of hand unit 43 through valve 45. The other two valves determine the new sequence in which the gages respond to the pressures. Manual knob 46 then adjusts the output of hand unit 43 to establish the fluid pressure in pipe 8.

Should the pressure condition in conduit 1 deviate from the time-cycle program predetermined for it, selector station 9 becomes an important means for isolating the program fluid pressure output of time-cycle unit 11 from relay 7 and substituting a manually established fluid pressure. Thus, while proper adjustments are made to the time-cycle unit 11, the actual value of the condition in conduit 1 is varied by hand control of the agent in conduit 17. The cam profile may be properly adjusted and communication between pipes 8 and 10 consummated when the program and condition magnitude have the proper relation. Further, the predetermined program established by the profile of the cam of time-cycle unit 11 can be modified within the limits of the influence of the manually controlled bias adjustment of station 9. By means of this structural addition to the combination, additional objects of the invention are achieved.

The specific description of the system is again brought to relay 7. It has been explained, as a comparative device, in its opposition of the measured and programmed fluid pressures established by transmitter 3 and unit 11. The output of relay 7 is received by pipe 13 for control of valve positioning relay 14.

The several functions of the various forms of relay 7 can now be appreciated. Initially, it may be seen that the proportionality between the input and output may be determined locally, and remotely, under manual direction. Additionally, a connection for setting the standardizing action of the relay is provided. Finally, an appropriate connection for imparting rate action to the output of the relay is provided. These structural features permit the characterization of the relay output in attainment of further objects of the invention.

Note, particularly, that the plan of establishing separate fluid pressures, representative of measured and program variables, gives unique flexibility to this system. Termination of the program pressure between cycler 11 and relay 7 permits substitution of the manual fluid pressure value, or insertion of a bias value, without depriving the overall system of the characteristics introduced by relay 7.

During certain periods of operation, it will probably become advisable to completely sever communication of those elements of the time-cycle system heretofore described, from the regulator for the agent which varies the condition in conduit 1. Further, it may be advisable to substitute a manually controlled fluid pressure for that of pipe 13. A relatively simple selector station 15 is located in pipe 13 for these purposes. The specific functions of structure represented by selector station 15 may be appreciated by consideration of the disclosure of co-pending application by Dickey et al. S. N. 251,406, filed October 15, 1951, now Patent 2,729,222.

Coming down to valve positioner relay 14, it is seen as mounted on valve 16 for regulating its position, and, therefore, the amount of agent flowing through conduit 17. Whether the pressure in pipe 13 comes from relay 7 or the manually controlled mechanism of selector station 15, it ultimately determines the magnitude of the variable pressure condition in conduit 1 in the attainment of further objects of the invention. Valve positioning relay 14 is a structure utilizing the principles disclosed in the patent to Gorrie et al. 2,679,829.

The foregoing disclosure is enlarged by reference to the structure of Fig. 2. Specifically, Fig. 2 is directed to structural details of time-cycle unit 11. In Fig. 1, the unit was indicated as mounted in recorder case 5, in positions complementary to those of recording units 6 and 12. This group mounting in recorder case 5 gives obvious advantages of centralization of the structure of the invention to promote ease of supervision by operating personnel.

Operation of unit 11 begins with noting that cam 25 is mounted for rotation by a constant speed motor 26 through gearing between motor and cam which establishes the time basis for the cycle of operation. Arm 27 is pivoted by the profile of cam 25 and carries nozzle 28 as one half of the pneumatic pressure couple regulating the output of unit 11. The other half of the couple is a flapper beam 29 which is also pivoted to cooperate flapper and nozzle by means of opposed forces established by the pneumatic pressure in bellows 30 and spring 31. Spring 31 has a constant spring rate, and therefore, the variation of pneumatic pressure in bellows 30, necessary to cause beam 29 to follow the positions of nozzle 28, will be proportional to the range of positions for nozzle 28 as fixed by the pivoting of arm 27 under the direction of the profile of cam 25.

The output of nozzle 28 and flapper beam 29 is amplified by booster relay 32. It is actually the output of this booster relay 32 which is placed in bellows 30 and simultaneously becomes the output of time-cycle unit 11. The specific disclosure of booster relay 32, and its combination with a nozzle-vane-bellows structure is set forth in at least the application by Gorrie et al. S. N. 289,402, filed May 22, 1952, now Patent 2,737,963.

The pneumatic pressure in pipe 13 then becomes the force which varies the supply of an agent through conduit 17. This pneumatic pressure, whether established by relay 7 or the manual control of station 15, acts through valve positioner 14 to regulate the opening of valve 16. The operation of the various components of the complete system is, therefore, consummated in a programmed variation of the pressure condition in conduit 1.

What I claim as new, and desire to secure by Letters Patent of the United States, is:

1. A system for controlling a variable, including, an instrument for establishing a first fluid loading pressure representative of the variable to be controlled, a fluid pressure transmitter establishing a second fluid pressure with a magnitude varying in accordance with a predetermined program, a selector station receiving the second fluid pressure from the transmitter and having provisions for alternately establishing the second fluid pressure and a manually determined fluid pressure as its output, a relay receiving the first fluid pressure and the selector station output in comparative relationship for establishing a control fluid pressure, and a control means for the variable responsive to the control fluid pressure.

2. The system of claim 1 in which the fluid pressure transmitter includes, a motion responsive fluid pressure valve, a cam with a profile cut to the predetermined program moving the valve, and a motor actuating the cam at a fixed rate.

3. The system of claim 2 in which the relay includes structure for proportioning its input fluid pressure range to its output pressure range.

4. The system of claim 3 in which the relay includes structure for giving a reset characteristic to its control fluid pressure.

5. The system of claim 4 in which the relay includes structure for giving a rate characteristic to its control fluid pressure.

6. A system for controlling a variable, including, an instrument for establishing a first fluid loading pressure representative of the variable to be controlled, a fluid pressure transmitter establishing a second fluid pressure whose magnitude is caused to vary on a time-cycle basis, a selector station structure receiving the second fluid pressure from the transmitter and having provisions for establishing an output of the second fluid pressure plus a manually determined bias, a relay receiving the first fluid pressure and the selector station output in comparative relationship for establishing a control fluid pressure, means continuously manifesting the values of the first fluid pressure, means continuously manifesting the values of the selector station output, and a control means for the variable responsive to the control fluid pressure.

References Cited in the file of this patent
UNITED STATES PATENTS

| | | |
|---|---|---|
| 2,675,826 | Kehoe | Apr. 20, 1954 |
| 2,701,576 | Higgins | Feb. 8, 1955 |